Aug. 11, 1964  E. C. BROWN ETAL  3,144,138
OUTRIGGER MECHANISM
Filed April 2, 1962  2 Sheets-Sheet 1

INVENTORS
EDWIN C. BROWN
ROY D. BROWNELL
BY
Wolfe, Hubbard, Voit & Osann
ATTORNEYS.

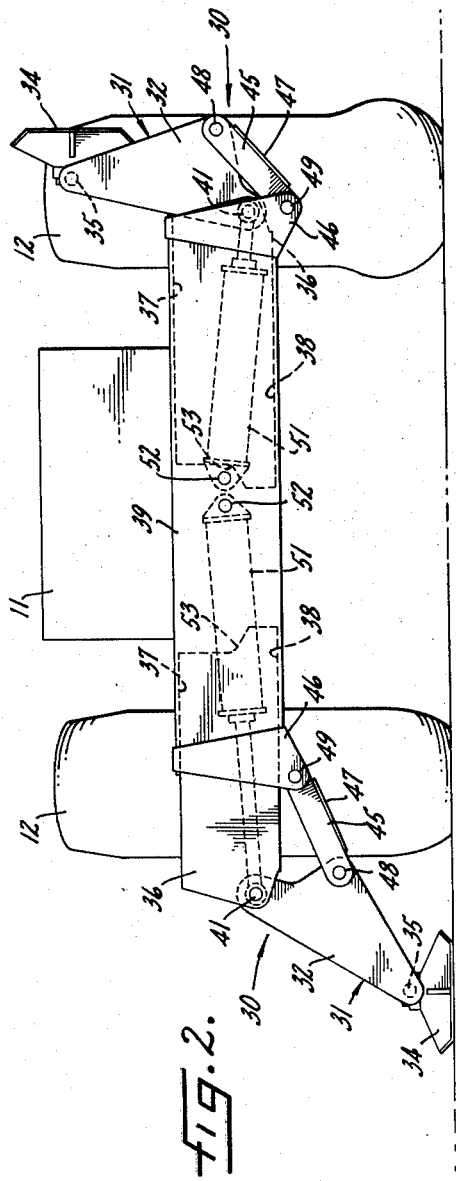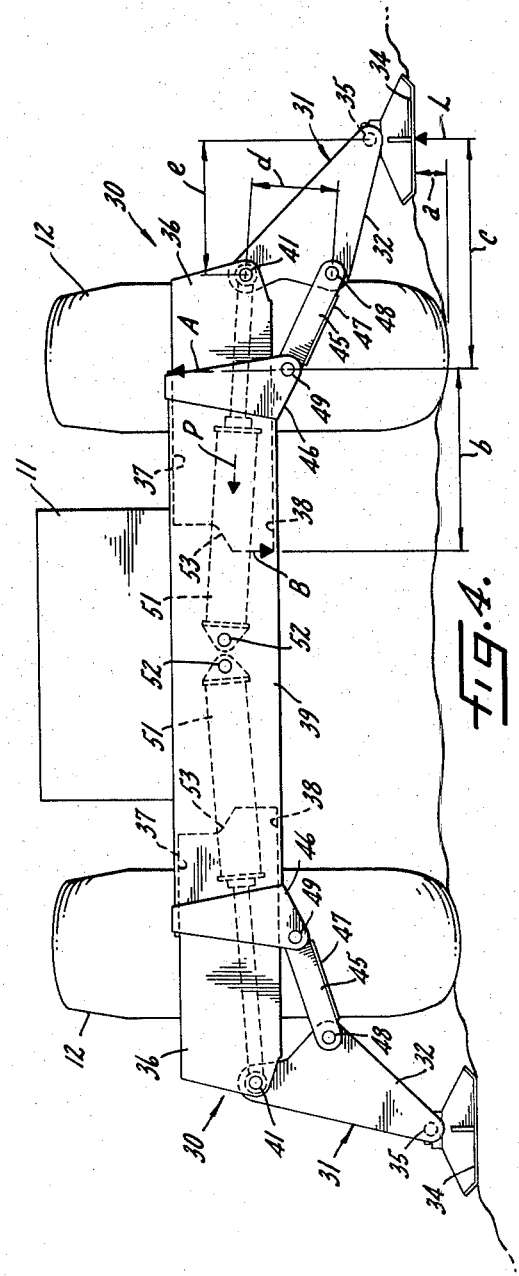

United States Patent Office 3,144,138
Patented Aug. 11, 1964

3,144,138
OUTRIGGER MECHANISM
Edwin C. Brown and Roy D. Brownell, Aurora, Ill., assignors to Baldwin-Lima-Hamilton Corporation, a corporation of Pennsylvania
Filed Apr. 2, 1962, Ser. No. 184,336
16 Claims. (Cl. 212—145)

The present invention relates to an outrigger mechanism for supporting a vehicle mounted crane, digger or the like by increasing the supporting base width of the vehicle, thereby affording lateral stability and relieving the load on the more narrowly situated wheels.

A primary aim of the invention is to provide an extensible outrigger mechanism which is substantially self-locking when supporting a load. It is a collateral object to provide a mechanism of this type which is capable of supporting heavy loads without overloading a relatively light weight and economical extending and retracting actuator.

Another object is to provide an outrigger mechanism of the above type which extends into supporting position with a folding and telescoping action that permits the use of an economical and efficient linear actuator.

A further object is to provide an outrigger mechanism as characterized above which provides a particularly fast pull-up of the ground engaging outrigger foot into transport position so that a relatively short stroke actuator can be utilized to efficiently operate the mechanism.

It is also an object to provide an outrigger mechanism of the above character which provides solid outrigger support for a vehicle when uneven ground is encountered and the ground engaging foot of the outrigger is seated above or below the ground level of the vehicle wheels. A related object is to provide an outrigger mechanism which may be used for leveling the vehicle when it is operated on sloping ground.

A more detailed object is to provide an outrigger mechanism as described above which extends from a transport position within the width of the vehicle wheels, to allow maximum statutory wheel width for transport purposes, to a support position that substantially increases the support width of the vehicle, i.e., the width between the oppositely extending ground engaging feet.

Other objects and advantages of the invention will become apparent upon reading the following detailed description and upon reference to the drawings in which:

FIG. 2 is an enlarged partial elevation of one end of the vehicle showing one of the outriggers in a transport position and the other in a support position;

FIG. 4 is similar to FIG. 2 showing both outriggers in supporting position on uneven terrain.

While the invention will be described in connection with a preferred embodiment, it will be understood that we do not intend to limit the invention to that embodiment. On the contrary, we intend to cover all alternatives, modifications and equivalents as may be included within the spirit and scope of the invention as defined by the appended claims.

Figure 1:
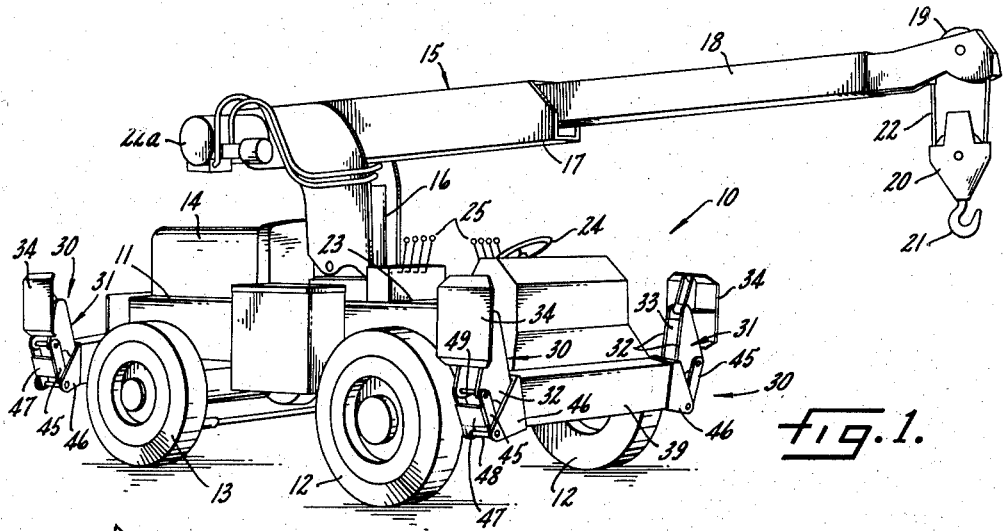
FIGURE 1 is a perspective view of a four wheeled vehicle carrying a hydraulically operated crane and incorporating the outrigger mechanism embodying the present invention.

Turning first to FIG. 1, there is shown a crane 10 of the self-propelled type which embodies outriggers constructed in accordance with the present invention. The crane includes a body 11 supported by front and rear wheels 12 and 13, respectively, and which carries a power plant or engine 14 and a hydraulically operated crane mechanism 15. In the illustrated construction, the crane mechanism 15 includes an upright supporting frame or turntable 16 mounted on the body 11 for rotation about a vertical axis. A boom support or shipper 17 is pivoted on the turntable 16 for up and down swinging movement and supports a boom 18 that is slidably mounted in the shipper so as to be extensible relative to the turntable. Pulley assemblies 19 and 20 support a hook member 21 on the outer end of the boom 18 through a cable 22 which is paid out and drawn in by a hydraulically driven winch 22a mounted at the rear of the shipper 17.

An operator's platform 23 is located at the forward end of the crane body 11 and provided with the usual steering wheel 24 and groups of control levers 25 which are associated with the hydraulic valves governing operation and movement of the crane mechanism.

The crane mechanism 15 is extremely versatile. The hook 21 can be swung horizontally through a full circle by rotation of the turntable 16. The vertical position of the hook is controlled by raising or lowering the shipper 17, and thus the boom 18, about its horizontal pivot on the turntable and also by paying out or retracting the cable 22. The reach of the boom 18 can be varied by extending or withdrawing the boom 18 within the shipper 17. All of these movements are preferably hydraulically powered and under the control of the levers 25. This versatility has made cranes of the exemplary type very useful for performing a wide variety of tasks. The crane 10, being self-propelled, gives the machine additional adaptability.

The body 11 obviously serves as the base or anchor for the crane mechanism 15 when the latter is in use. It will thus be readily apparent that the extensible boom 18, particularly when extended laterally from the vehicle body 11, creates a long moment arm which causes a load supported by the crane to exert considerable torque tending to tip or overturn the vehicle. Since the crane 10 is intended to be self-propelled, the suspension system and pneumatic tires for the wheels 12, 13 provide a relatively soft support for the crane mechanism. The crane outriggers are thus intended to anchor the crane body 11 relative to the ground and stabilize the crane, as will be well understood by those skilled in the art.

In the illustrated embodiment, the crane 10 is provided with an outrigger mechanism 30 at each of its four corners. The outrigger mechanisms, when planted on the ground, increase the supporting base of the crane, rigidify the crane body 11 relative to the ground, and relieve the wheels 12, 13 and associated structure from the crane-steadying loads developed when using the crane mechanism 15. Since the pair of outrigger mechanisms 30 at the front of the crane 10 are identical to the pair at the rear, it will be convenient to consider only the front outrigger arrangement in detail.

Figure 3:
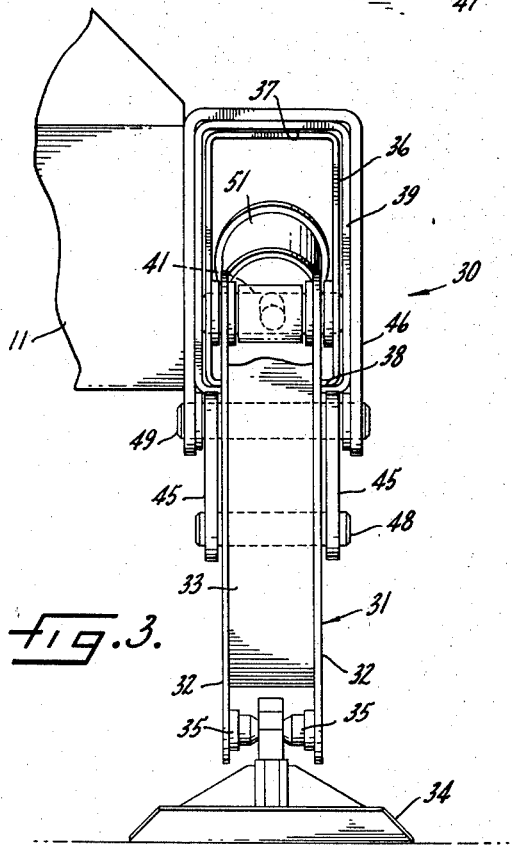
FIG. 3 is an enlarged side view of one outrigger in the support position.

In accordance with the present invention, the outrigger mechanisms 30 are substantially self-locking so that even heavy loads are transferred directly from the ground to the crane body 11 through relatively massive pieces of the outrigger mechanism and without appreciably loading the more expensive and vulnerable outrigger positioning devices. In the preferred construction, each outrigger mechanism 30 includes a leg 31 that is vertaically swingable from a raised transport position, shown in FIG. 1 and at the right in FIG. 2, to a lowered ground engaging support position, shown at the left in FIG. 2 and in FIGS. 3 and 4. The legs 31 are formed by a pair of spaced parallel plates 32 joined by a central rib 33 (see FIG. 3) so as to form a rigid box-like structure capable of sustaining heavy loads. Preferably, a foot plate 34 is freely pivoted at the outer end of each leg 31 on opposed ball faced studs 35. The foot plates 34 give the outrigger legs 31 a flat base to plant on the ground and the ball faced studs 35 allow the plates 34 to both conform to the ground and also freely hang in folded position when the legs are swung to their raised transport positions (see FIG. 2).

To support the outrigger legs 31 and create the self-locking action embodied in the outrigger mechanisms 30, the legs are pivoted on the ends of slide members 36 which reciprocate between generally horizontally disposed frame surfaces 37 and 38. In the illustrated construction, the slide members 36 are generally rectangular tubes which are telescoped in opposite ends of a generally rectangular tubular frame 39 whose inner top and bottom walls define the frame surfaces 37, 38 (see particularly FIG. 3). The frame 39 is rigidly fastened to the crane body 11 so as to form a transversely extending integral portion of the crane body. The plates 32 defining the legs 31 are pivoted at the outer ends of the side members 36 by pins 41, with the plates 32 being fitted just within the side walls of the slide members 36. The slide members are proportioned to telescope freely into the ends of the frame 39 so as to be readily movable from an inner transport position, seen at the right in FIG. 2, to laterally extending support positions, shown at the left in FIG. 2 and in FIG. 4.

For positioning the legs 31 incident to sliding movement of the slide members 36, links 45 couple the legs 31 and the frame 39 so that the legs are swung upwardly to their raised transport positions when the members 36 are slid into the frame 39, and the legs 31 are swung downwardly into ground engaging contact when the associated side members 36 are extended to their support positions. Preferably, the leg plates 32 defining the legs 31 are generally triangular and the links 45 are extended in parallel pairs from the depending flanges of a U-shaped strap 46 fixed on each end of the frame 39 to the corners of the planes 32 intermediate the frame 39 and the foot 34. The links 45 are pivoted to the legs 31 by pins 48 and to straps 46 by pins 49 and each pair of links 45 is rigidified by an underlying base plate 47. The ends of the links 45 pivoted on the pins 49 thus remain fixed with respect to the frame 39 and the crane body 11 so that lateral sliding movement of the members 36 causes the links 45 to swing the legs 31 up and down between support and transport positions.

To drive or operate the outrigger mechanisms 30, a pair of double-acting, linear hydraulic actuators 51 are positioned within the members 36 and the frame 39 and are extended from anchor pins 52 to the pivot pins 41. The pins 41 thus perform the dual function of pivoting the legs 31 on the slide members 36 as well as anchoring the actuator 51 to the slide members. Preferably, the inner ends of the slide members 36 are relieved at 53 so as to clear the anchor pins 52 and allow the slide members to abut one another when in retracted, transport position. This permits a maximum extensible length for increasing the supporting base width of the vehicle without overlapping the slide members into side-by-side relation and creating a bulky assembly.

In operation, and with reference to the mechanism at the right in FIG. 2, it can be seen that extension of the actuator 51 to drive the slide member 36 laterally from its illustrated transport position causes the links 45 to swing clockwise so as to pull the leg 31 outwardly and downwardly about the pin 41. The foot plate 34 is thus lowered into a ground engaging position and further outward movement of the slide member 36 tends to lift the crane body 11 so that the crane becomes solidly supported on the ground. Because of the outward as well as the downward movement of the legs 31 as they swing into support positions, it can be seen that the base width of the crane is substantially increased so as to further improve the lateral stability of the crane. Reverse inward sliding movement of the slide members 36, of course, folds the associated leg 31 upwardly and inwardly into transport position illustrated at the right of FIG. 2.

It is of particular importance to an understanding of the invention to appreciate that the support loads borne by the outrigger mechanisms 30 cause a binding or frictional loading of the slide members 36 between the opposed frame surfaces 37, 38 which resists collapsing movement of the mechanisms under load. That is, a reactive force or load L (see FIG. 4) on the foot plate 34 tends to cant or cock the slide member 36 in the frame 39 so as to produce forces A and B which resist this turning movement of the slide member 36 and which also tend to frictionally lock the slide member in place. The force A acts upwardly on the frame 39 at the outer edge of the surface 37, and the force B acts downwardly on the frame 39 where the inner lower end of the slide member 36 strikes the surface 38. The outrigger load L is thus directly transferred to the frame 39 and the crane body 11, with the result that the actuator 51 is simply called upon to position the outrigger mechanism and not to withstand the loads borne by the outrigger in stabilizing the crane. It can also be seen that an increase in the force L, i.e., an increase in the load on the outrigger mechanism, will cause an increase in the frictional force that is produced by the forces A and B. Thus, the self-locking tendency of the outrigger mechanism is also self-regulating, with the amount of frictional force generated being directly related to the amount of load which the outrigger is called upon to bear.

The magnitude of this self-locking effect can best be seen by an example. In a typical practical example, illustrated at the right of FIG. 4, planting the foot plate 34 a distance $a$ that is six inches above the ground line of the crane causes the forces A and B to be laterally spaced a distance $b$ equal to $28\frac{3}{16}$ inches while the force L, acting at the center of the foot plate 34, is spaced outwardly from the force A a distance $c$ equal to $39\frac{5}{8}$ inches. Under these conditions, the actuator 51 swings the leg 31 downwardly about a moment arm $d$ equal to the spacing between the pins 41, 48 that is equal to $13\frac{11}{16}$ inches and the force L acts on the actuator 51 through a moment arm $e$ equal to 23 inches representing the lateral distance between the pin 41 and the upwardly acting force L.

Using these typical representative dimensions, and assuming an outrigger load of 30,000 pounds, i.e, L equals 30,000 pounds, a reactive force P exerted on the actuator 51 absent all friction, would equal $$\frac{30,000(e)}{d}$$

or $$\frac{30,000(23)}{13.687}$$

or 50,412 pounds. Friction, of course, does exist between the slide member 36 and the frame 39 as a result of the forces A and B. The force A, in our example, equals $$\frac{30,000\ (c+b)}{b}$$

or $$\frac{30,000\ (67.812)}{28,187}$$

or 72,173 pounds. Force B equals $$\frac{30,000\ (c)}{b}$$

or $$\frac{30,000\ (39.625)}{28.187}$$

or 42,137 pounds. Assuming a conservative coefficient of friction of 0.3, the frictional forces resisting inward movement of the slide member 36 would thus be equal to 0.3 (72,173+42,173) or 34,306 pounds. This resistance to inward movement of the slide member 36 can thus be subtracted from the previously calculated load P to give the actual loading of the actuator 51, which, in this example, would be 16,106 pounds. Assuming that a six inch diameter actuator were utilized, this would indicate that the actuator would have to develop an inner loading of 569 p.s.i. to lock the outrigger mechanism in place.

Making this same set of calculations for the representative outrigger mechanism when the foot plate 34 is at the vehicle ground level, as at the left in FIG. 2, or is somewhat below the vehicle ground level, as at the left in FIG. 4, shows that the frictional resistance to inward movement of the slide member 36 exceeds that necessary to support a 30,000 pound load on the foot plate 34. Thus, in these positions of the outrigger mechanism, the unit is completely self-locking with there being no load at all on the actuator 51.

Those skilled in this art will appreciate that even a loading of 569 p.s.i. as determined in the example calculated above is considerably less than that encountered in conventional outrigger mechanisms under similar load conditions. Conventionally, outrigger positioning actuators are subjected to loadings on the order of magnitude of 4,000 p.s.i. under the conditions postulated above. It can thus be seen that the outrigger mechanisms 30 permit substantially lighter actuators to be effectively used, therefore producing a more economical construction that is also significantly more safe. Extremely high hydraulic pressures are not developed even when heavy loads are borne by the outrigger mechanisms 30.

A further important feature of the inventive outrigger mechanisms is that only a short stroke of the linear actuators 51 is required to swing the legs 31 from their support to their transport positions. Moreover, it will be appreciated that the legs 31 swing much more rapidly at the top of their arcs than through the lower portion of their swinging movement. This means that the foot plates 34 can be planted solidly through a range both slightly above and slightly below the normal ground level of the vehicle without sacrificing a rapid retracting movement to transport position and while maintaining a relatively short actuating stroke.

This action can be appreciated by noting the geometry of the parts in their several positions. With the outrigger legs 31 swung downwardly into their support positions as shown in FIG. 4 and at the left in FIG. 2, it can be seen that inward movement of the slide members 36 causes the legs 31 to initially pivot about the pins 48 with the links 45 remaining temporarily in a substantially fixed condition. Thus, the foot plates 34 move through approximately the same distances as the slide members 36 are driven by the actuators 51.

However, in the upper portion of the arcs through which the legs 31 are swung, the legs swing about the pins 41 with the links 45 exerting the turning forces. This can be seen by studying the transport position shown at the right in FIG. 2. With the parts so positioned, a slight lateral movement of the pin 41 causes the fixed-length links 45 to swing the outrigger leg 31 through a substantial distance. The foot plate 34 thus moves much more rapidly than the slide member 36.

In summary then, uniform sliding movement of the members 36 cause relatively rapid movement of the foot plate supporting ends of the legs 31 as they move initially from their upraised transport positions. However, as soon as the links 45 swing downwardly so that the legs begin to rotate almost solely about the pins 48, the swinging speed of the legs is substantially decreased so that the foot plates 34 are planted relatively slowly into firm, ground engaging contact. Upon reverse movement of the outrigger mechanisms, the legs 31 are lifted relatively slowly from their support positions and then swing quite rapidly through the final portion of their movement into transport position.

In the preferred construction, the parts are proportioned so that the outer portion of the outrigger mechanisms, when the latter are in transport positions, lie substantially at or within the outer surfaces of the wheels 12, 13. This allows a maximum statutory wheel track for the crane 10 without the outrigger mechanisms exceeding the allowable vehicle width. As has already been observed, lowering the outrigger mechanisms into their support positions greatly extends the supporting width of the vehicle body so as to further increase the lateral stability of the outrigger supported crane.

We claim as our invention:

1. An outrigger mechanism for a vehicle comprising, in combination, a frame on said vehicle defining a pair of generally horizontally disposed surfaces, a member slidably mounted for transverse movement between said surfaces, said member being extensible from a transport position to a laterally extending support position, a leg pivoted to the extending end of said member for vertically swinging movement, a link coupling said leg and said frame so that the leg is swung upwardly when said member is in transport position and the leg is swung downwardly into ground engaging contact when said member is in support position, and means for shifting said member between transport and support positions.

2. An outrigger mechanism for a wheel supported vehicle comprising, in combination, a frame on said vehicle defining a pair of generally horizontally disposed surfaces, a member slidably mounted for transverse movement between said surfaces, said member being extensible from a transport position to a laterally extending support position, a leg pivoted to the extending end of said member for vertically swinging movement, a link coupling said leg and said frame so that the leg is swung upwardly above said frame and inboard of the vehicle wheels when said member is in transport position and the leg is swung downwardly into ground engaging contact when said member is in support position, and means for shifting said member between transport and support positions.

3. An outrigger mechanism for a vehicle comprising in combination, a transverse frame on said vehicle defining generally parallel, horizontally disposed surfaces, a member slidably mounted for transverse movement between said surfaces, said member being extensible from a transport position to a laterally extending support position, said frame having an anchor pin located inwardly of said member, a leg pivoted to the extending end of said member for swinging movement in a transverse vertical plane, a link coupling said leg and said frame so that the leg is swung upwardly when said member is in transport position and the leg is swung downwardly into ground engaging contact when said member is in support position, and a linear actuator having one end secured to said anchor pin and pivotally connected at its other end to said member for shifting said member between transport and support positions.

4. An outrigger mechanism for a wheel supported vehicle comprising, in combination, a cross frame on said vehicle defining generally parallel, horizontally disposed surfaces, a member slidably mounted for transverse movement between said surfaces, said member being extensible from a transport position to a laterally extending support position, a leg pivoted to the extending end of said member for swinging movement in a transverse vertical plane, said member becoming frictionally bound between said frame surfaces upon transfer of a generally vertical load through said leg, a link coupling said leg and said frame so that the leg is swung upwardly inboard of the vehicle wheels when said member is in transport position and the leg is swung downwardly into ground engaging contact when said member is in support position, and means for shifting said member between transport and support positions.

5. An outrigger mechanism for a vehicle comprising, in combination, a generally tubular frame member attached to said vehicle, a slide member mounted within said frame for telescopic movement therewith, a hydraulic actuator having one end anchored to said frame and the other end pivotally connected to the outer end of said slide, a generally triangular leg member having one corner pivotally connected to the outer end of said slide and extending upwardly from said frame so as to have an upper corner and an outer corner, said leg having a foot member freely pivoted to said upper corner, a link pivotally connected at one end to said frame and pivotally connected at the other end to said outer corner of said leg so as to hold said leg in the vertical position when said slide is fully retracted within said frame, and said link being proportioned to cause said leg to swing downwardly and outwardly and plant said foot in a ground-engaging position as said slide is telescoped out of said frame.

6. An outrigger mechanism for a vehicle comprising, in combination, a generally tubular frame member attached to said vehicle, said frame being reinforced at its outer end by a collar member having downwardly depending flanges, a slide member mounted within said frame for telescopic movement therewith, a hydraulic actuator having one end anchored to said frame and the other end pivotally connected to the outer end of said slide, a generally triangular leg member having one corner pivotally connected to the outer end of said slide and extending upwardly from said frame so as to have an upper corner and an outer corner, said leg having a foot member freely pivoted to said upper corner, a link pivotally connected at one end to the depending flanges of said collar and pivotally connected at the other end to said outer corner of said leg so as to hold said leg in the vertical position when said slide is fully retracted within said frame, and said link being proportioned to cause said leg to swing downwardly and outwardly and plant said foot in a ground-engaging position as said slide is telescoped out of said frame.

7. An outrigger mechanism for a vehicle comprising, in combination, a generally tubular frame member attached to said vehicle, said frame being reinforced at its outer end by a saddle-like collar having downwardly depending flanges, a tubular slide member mounted within said frame for telescopic movement therewith, a hydraulic actuator having one end anchored to said frame and the other end connected by means of a pivot pin to the outer end of said slide, a generally triangular leg member having one corner pivotally connected to said pin on the outer end of said slide and extending upwardly from said frame so as to have an upper corner and an outer corner, a link pivotally connected at one end to the depending flanges of said collar and pivotally connected at the other end to said outer corner of said leg so as to hold said leg in the vertical position when said slide is fully retracted within said frame, and said link being proportioned to cause said leg to swing downwardly toward a ground-engaging position as said slide is telescoped out of said frame.

8. An outrigger mechanism for a vehicle comprising, in combination, a generally tubular frame member attached to said vehicle, said frame being reinforced at its outer end by a saddle-like collar having downwardly depending flanges, a tubular slide member mounted within said frame for telescopic movement therewith, a hydraulic actuator having one end anchored to said frame and the other end connected by means of a pivot pin to the outer end of said slide, a generally triangular leg member having one corner pivotally connected to said pin on the outer end of said slide and extending upwardly from said frame so as to have an upper corner and an outer corner, said leg having a foot member freely pivoted to said upper corner, a link pivotally connected at one end to the depending flanges of said collar and pivotally connected at the other end to said outer corner of said leg so as to hold said leg in the vertical position when said slide is fully retracted within said frame, and said link being proportioned to cause said leg to swing downwardly and plant said foot in a ground-engaging position as said slide is telescoped out of said frame.

9. An outrigger mechanism for a vehicle comprising, in combination, a rigid frame member attached to said vehicle, a slide member mounted within said frame member and telescopically movable therewith, a hydraulic actuator having one end anchored to said frame and the other end secured to said slide for effecting said telescopic movement, a leg member pivotally connected to said slide at the outer end thereof, said leg having a freely pivoted foot member with a substantially flat base on the end remote from said slide, a link pivotally connected at one end to said frame and pivotally connected at the other end to said leg serving to hold said leg in a substantially vertical position when said slide is moved to its inward position in relation to said frame, and said link being proportioned to cause said leg to swing downwardly toward a ground-engaging position when said slide is moved outwardly from said frame.

10. An outrigger mechanism for a wheel supported vehicle comprising, in combination, a rigid frame member attached to said vehicle, said frame member having a strap secured at its outer end with downwardly depending flanges, a slide member mounted within said frame member and telescopically movable therewith, a hydraulic actuator having one end anchored to said frame and the other end secured to said slide for effecting said telescopic movement, a leg member pivotally connected to said slide at the outer end thereof, said leg having a freely pivoted foot member with a substantially flat base on the end remote from said slide, a link pivotally connected at one end to said downwardly depending flange and pivotally connected at the other end to said leg serving to hold said leg in a substantially vertical position inboard of the vehicle wheels when said slide is moved to its inward position in relation to said frame and said link being proportioned to cause said leg to swing downwardly toward a ground-engaging position substantially outside the vehicle wheels when said slide is moved outwardly from said frame.

11. An outrigger mechanism for a wheel supported vehicle comprising, in combination, a rigid frame member attached to said vehicle, said frame member having a strap secured at its outer end with downwardly depending flanges, a slide member mounted within said frame member and telescopically movable therewith, a hydraulic actuator having one end anchored to said frame and the other end secured to said slide for effecting said telescopic movement, a leg member pivotally connected to said slide at the outer end thereof, said leg having a freely pivoted foot member with a substantially flat base on the end remote from said slide, a link pivotally connected at one end to said downwardly depending flange and pivotally connected at the other end to said leg serving to hold said leg in a substantially vertical position inboard of the vehicle wheels when said slide is moved to its inward position in relation to said frame, said link being proportioned to cause said leg to swing downwardly toward a ground-engaging position substantially outside the vehicle wheels when said slide is moved outwardly from said frame, and said slide having a binding surface for frictionally engaging said frame when a ground-engaging force is applied to said leg.

12. An outrigger mechanism for a vehicle comprising, in combination, a generally tubular frame member attached to said vehicle, a pair of slide members mounted for telescopic movement within said frame member, said slide members being movable from support positions wherein the members extend from opposite ends of said frame member to transport positions wherein the slide members are received in abutting relation within said frame member, a pair of ground-engaging legs pivoted respectively on the outer ends of said slide members, and means interconnecting said legs and said frame member for swinging said legs from a substantially vertical, upraised position down into ground-engaging contact as the slide members are extended to support positions.

13. An outrigger mechanism for a vehicle having an outer transverse dimension comprising, in combination, a generally tubular frame member attached transversely to said vehicle, a pair of slide members mounted for movement within said frame member, said slide members being movable from support positions wherein the members extend beyond said outer dimension from opposite ends of said frame member to transport positions wherein the slide members are received within said frame member, a pair of ground-engaging legs pivoted respectively on the outer ends of said slide members, and means interconnecting said legs and said frame member for swinging said legs from a substantially vertical, upraised position down into ground-engaging contact as the slide members are extended to support positions, said legs being within said outer dimension when said slide members are in transport positions.

14. An outrigger mechanism for a vehicle comprising, in combination, a generally tubular frame extending transversely across said vehicle, a slide member mounted within said frame for telescopic movement therein from a retracted transport position to a laterally extending support position, a leg pivoted to the outer end of said member for vertically swinging movement, said member becoming frictionally bound within said frame upon transfer of a generally vertical load through said leg, an actuator for selectively shifting said member between said transport and support positions, and a link interconnecting said leg and said frame for swinging said leg upwardly when said member is shifted to transport position and for swinging said leg downwardly into ground engaging contact when said member is shifted to support position.

15. An outrigger mechanism for a vehicle comprising, in combination, a generally tubular frame extending transversely across said vehicle, a slide member mounted within said frame for telescopic movement therein from a retracted transport position to a laterally extending support position, a leg pivoted to the outer end of said member for vertically swinging movement, an actuator coupled between said member and said frame for selectively shifting said member between said transport and support positions, and a link interconnecting said leg and said frame for swinging said leg upwardly when said member is shifted to transport position and for swinging said leg downwardly into ground engaging contact when said member is shifted to support position, said member and said frame being arranged and proportioned so that substantially all of the ground engaging forces exerted through said downwardly extending leg are transferred through said member to said frame whereby the force on said actuator is minimized.

16. An outrigger mechanism for a vehicle comprising, in combination, a substantially horizontally disposed, generally tubular frame on said vehicle, a slide member mounted within said frame for telescopic movement therein from a retracted transport position to a laterally extending support position, a leg pivoted to the outer end of said member for vertically swinging movement through an arc extending above and below said frame, an actuator for selectively shifting said member between said transport and support positions, and a link interconnecting said leg and said frame for swinging said leg upwardly when said member is shifted to transport position and for swinging said leg downwardly into ground engaging contact when said member is shifted to support position, said link coupled to said leg whereby the swinging movement of said leg in the upper portion of said arc is substantially more rapid than the swinging movement of said leg in the lower portion of said arc.

References Cited in the file of this patent

UNITED STATES PATENTS

| | | |
|---|---|---|
| 2,777,586 | Boysen et al. | Jan. 15, 1957 |
| 3,007,717 | Noly | Nov. 7, 1961 |
| 3,021,016 | Noll et al. | Feb. 13, 1962 |
| 3,100,049 | Garnett | Aug. 6, 1963 |